United States Patent [19]

Hearn

[11] 3,976,937

[45] Aug. 24, 1976

[54] METHOD AND APPARATUS FOR RECORDING POSITION OF SENSOR IN AIRBORNE MAGNETIC SURVEYING

[75] Inventor: Daniel P. Hearn, Richardson, Tex.

[73] Assignee: Atlantic Richfield Company, Los Angeles, Calif.

[22] Filed: Apr. 16, 1973

[21] Appl. No.: 351,177

[52] U.S. Cl. .................................... 324/4; 354/70
[51] Int. Cl.² .................... G01V 3/16; G01C 11/00
[58] Field of Search .............. 324/4, 43, .5 G, .5 R; 95/12.5

[56] References Cited
UNITED STATES PATENTS

| | | | |
|---|---|---|---|
| 1,528,933 | 3/1925 | Lyon | 95/12.5 |
| 2,557,158 | 6/1951 | Teichmann | 95/12.5 X |
| 2,779,914 | 1/1957 | Rumbaugh et al. | 324/4 |
| 2,955,251 | 10/1960 | Shaw et al. | 324/4 |
| 3,418,568 | 12/1968 | Hearn | 324/4 X |
| 3,485,151 | 12/1969 | Taylor | 95/12.5 |
| 3,536,992 | 10/1970 | Jensen et al. | 324/4 |
| 3,728,612 | 4/1973 | Hearn et al. | 324/.5 R |

*Primary Examiner*—Gerard R. Strecker
*Attorney, Agent, or Firm*—Robert M. Betz

[57] ABSTRACT

A method and apparatus for recording the position of a sensor to reduce turbulence errors in airborne magnetic surveying includes, in one embodiment a camera mounted on a gyrostabilized platform to maintain it at a constant downward orientation from a bird towed from an airplane. The bird, in addition to the platform and camera, carries a magnetometer sensor which measures the magnetic field at the bird at a predetermined rate. The camera is actuated at the times the magnetic field is measured, whereby the position of the magnetometer can be precisely located for each measurement taken. In another embodiment, two birds towed from an airplane each carries a magnetometer sensor. The two birds are towed at different altitudes, one above the other, and a camera is carried by the bird at the higher altitude to photograph the bird at the lower altitude and the earth to precisely record the relative locations of the birds with respect to each other and the earth when the magnetic measurements are made. A barometer transducer is carried by at least one of the birds to precisely measure the height of the birds with respect to each other and the earth.

1 Claim, 1 Drawing Figure

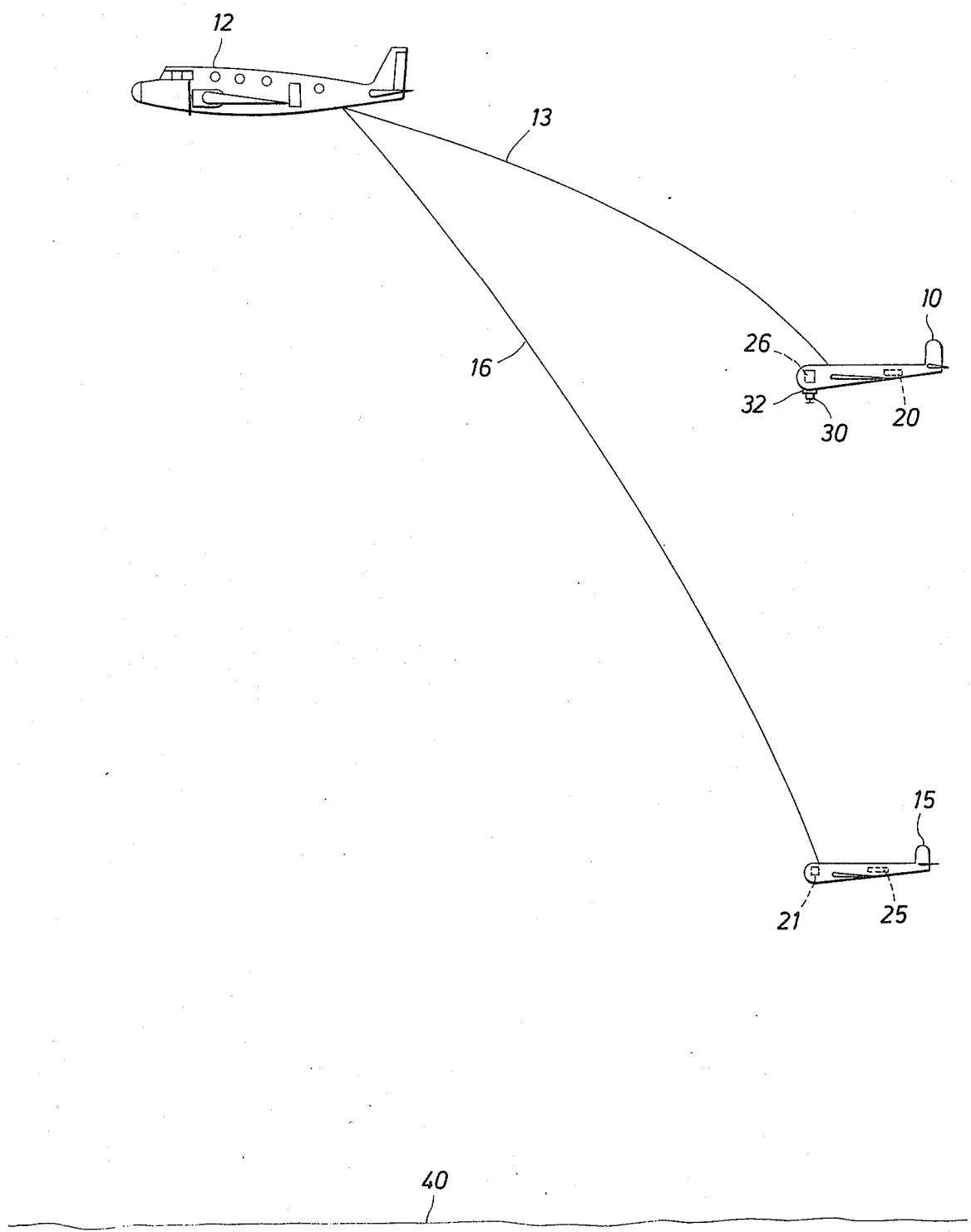

METHOD AND APPARATUS FOR RECORDING POSITION OF SENSOR IN AIRBORNE MAGNETIC SURVEYING

BACKGROUND OF THE INVENTION

1. Field of the Invention

This invention relates to methods and apparatus for magnetic surveying, and more particularly to methods and apparatus for precisely locating airborne magnetic field measuring instruments.

2. Description of the Prior Art

Magnetic surveying is, with increasing frequency, done by towing a magnetometer measuring apparatus in one or more "birds" from an airplane. An example of such magnetometer apparatus and method can be found in U.S. Pat. No. 3,418,568, which is incorporated herein by reference.

Presently, in conducting such magnetic surveying, a camera is ordinarily bolted to the frame of the aircraft to photograph the route of the survey for location reference for subsequent data analysis. The rate of which the photographs are taken is determined by the speed of the aircraft, usually so that each photograph will overlap to some degree the last for a continuous photographic record of the area surveyed. Often, however, the camera does not photograph the bird or birds towed by the airplane, it being primarily intended only to locate the position of the airplane along the surveyed path. Because of wind gusts, and other reasons, however, the birds usually do not exactly track or follow the path of the airplane. It can be seen, for example, that even minor corrections in the direction of the airplane may result in large or exaggerated movements of the bird trailing on relatively long tow cables, much like the fast movement presented at the tip of a whip.

Furthermore, because the camera is bolted directly to the frame of the airplane, as small corrections in direction of flight are made by the pilot, the aircraft tilts causing the camera to record the earth's surface beneath the airplane from an angle other than true perpendicular. Thus, in subsequent interpretation of the location of the airplane, for example, in matching the photographs taken with maps, the precise position of the aircraft and, of course, the trailing bird, a necessity for accurate surveying, may be erroneously located.

Another particularly distinct problem encountered in airborne magnetic surveys, especially high precision surveys in which a plurality of magnetic measurements are simultaneously made, for instance, from a number of towed birds to measure the magnetic gradient therebetween, extremely calm air conditions must exist for accurate surveys. It has been estimated, for instance, that in conducting ordinary magnetometer surveying, only one day out of every four, on the average, is suitable for flying and conducting such surveys. Even then, frequently only a minimum acceptable amount of turbulence is present in the early morning hours. Furthermore, the error introduced by air turbulence is compounded in gradient surveys in which far less flying time acceptable for accurate measurements ordinarily exists.

Additional sources of "noise" (i.e. uncertainty in the bird location reflected into the interpretation of the measurement data obtained) is derived from the instantaneous positions of the bird or birds in rolling, horizontal, and vertical movements, which are undetected from the airplane and which change the relative magnitude of the magnetic field measured.

Especially in gradient measurements, the displacement between the birds is a critical factor in obtaining consistent magnetic readings. Very minor variations, for example, of the lower bird with respect to the upper bird generates major noise in the results obtained due to changes in spacing and also in vector direction of the difference measurement.

BRIEF SUMMARY OF THE INVENTION

In light of the above, it is an object of the invention to provide a method, apparatus, and system for precisely locating the position of a bird carrying magnetic field measuring equipment.

It is another object of the invention to provide a method and apparatus for more accurately conducting airborne magnetic surveys than heretofore.

It is another object of the invention to provide a method and apparatus for conducting airborne magnetic surveying in weather conditions more turbulent than heretofore practicable.

It is another object of the invention to provide a method and apparatus for conducting airborne magnetic surveying in which the location of the points at which magnetic field measurements are made are photographically recorded.

It is still another object of the invention to provide a method and apparatus for reducing the noise in airborne magnetic surveying measurements, arising from uncertainties in the data obtained.

It is still another object of the invention to provide a method and apparatus for improving the quality of data obtained from plural bird airborne magnetic field measuring equipment.

It is yet another object of the invention to provide a method and apparatus for precisely locating the position of a lower bird with respect to an upper bird in conducting an airborne magnetic survey.

These and other objects, features, and advantages will become apparent to those skilled in the art from the following detailed description, when read in conjunction with the accompanying drawings and appended claims.

In accordance with one embodiment of the invention, in its broad aspect, a system for measuring magnetic fields from an airplane includes a first bird carrying a magnetometer sensing means and towed by the airplane. A camera is mounted on a gyrostabilized platform attached to the bird to be maintained at a constant downward orientation. When the magnetometer measurements are taken the camera is actuated to photograph the earth directly below the bird to enable the magnetometer to be precisely located. In another embodiment of the invention, in its broad aspect, a second bird also carrying a magnetometer sensing means is maintained at a lower altitude than that of the first bird. A camera means is carried by the first bird to photograph the second bird and the earth in synchronism with the magnetic field measuring rate, whereby the position of the second bird is accurately recorded with respect to the position of the first bird and the earth. The system, still more particularly, includes means carried by at least one of the birds for measuring its altitude.

In accordance with another broad aspect of the invention, a method is presented for measuring magnetic fields from an airplane, which includes towing first and second birds from the airplane. Each bird carries a magnetometer means for measuring magnetic fields at predetermined times, and the second bird is at an altitude lower than the altitude of the first bird and is located generally below the first bird. The method also includes the steps of photographing the second bird from the first bird in synchronism with the predetermined measuring times and recording the altitude of at least the second bird at the predetermined measuring times.

BRIEF DESCRIPTION OF THE DRAWING

The invention is illustrated in the sole accompanying drawing, showing a diagrammatic view of the relative location of the birds with respect to the airplane, each other and the earth, in accordance with the method and apparatus of the invention.

DETAILED DESCRIPTION OF THE PREFERRED EMBODIMENTS

The invention shown in the sole FIGURE of the accompanying drawing illustrates a dual bird configuration, as may be used, for example, in magnetic gradient surveys. A first bird 10 towed from an airplane 12 by a tow cable 13 which has high drag aerodynamic design, and a second bird 15 is also towed from the airplane 12, but by a tow cable 16 which has a low drag aerodynamic design. The low drag cable 16 is of length longer than the high drag cable 13; therefore, the second bird 15 is towed generally at an altitude lower than the first bird 10 and is located generally below the first bird.

Each of the birds 10 and 15 carries means for measuring the magnetic field thereat. Thus, as shown, near the tail of the first and the nose of the second birds, elements of a magnetometer measuring means 20 and 21, such as appropriate elements of an optically pumped helium magnetometer, are respectively located. Such magnetometer elements may be those as described in U.S. Pat. No. 3,728,612, which is hereby incorporated herein by reference, or may include all the magnetometer elements but the power supply and variable frequency oscillator (not shown), which may be located in the airplane 12.

On at least the second bird 15, and preferably on both birds 15 and 10, barometric transducers 25 and 26 are respectively carried. The barometric transducers, well known in the art, measure the short-term altitude variations with respect to time, and transmits the measured information along the drag tow cables 13 and 16 to recording instruments (not shown) within the airplane 12. Thus, as the survey is conducted, long-term variations and altitude are corrected by the pilot of the airplane 12 by his steering the airplane at a constant average altitude. The short-term variations, on the order of ten to twenty seconds, or less than, for example, a few minutes, on the other hand are detected by the barometric transducers 25 and 26 and recorded.

A camera means 30 is carried by the first bird, and is controlled by the apparatus for measuring the time periods at which the measurements are taken. Thus, if magnetometer readings are taken at rates or time periods corresponding to, for example, every five seconds, or corresponding to, for instance, every one-third mile, the timing apparatus, in addition to reading or recording the measured magnetic field, also trips the shutter of the camera means. The camera thereby photographically records the location at which the measurement was taken, and the photograph can be later compared to maps of the area surveyed to accurate plotting of measurement position. Also, the precise orientation of the lower or second bird is also recorded on the photograph, so that if, for instance, at the time instant the measurement was taken, the birds were not in vertical alignment, the alignment they were actually in would be apparent from the photograph and the appropriate correction determined. Thus, the noise attributable to the uncertainty of the bird positions can be almost entirely eliminated.

The control lines to the camera means 30 may be conducted along the high drag tow cable 13 along with the various other control lines carried therein.

To further control the accuracy of the measurements taken, the camera means 30 can be mounted on a means for maintaining its horizontal orientation independently of that of the bird 10, such as by a gyrostabilized platform 32, whereby any roll of the upper bird 30 is not reflected in corresponding rotational movement of the camera means 30 thereon mounted. The gyrostabilized table can include an air driven flywheel, so that powered equipment on the bird is minimized.

Any commercially available camera can be used, but because the camera may affect the magnetic field which is measured by the magnetometer means in the upper bird 10, the camera should be made of parts which are nonmagnetic. Thus, a camera having, for example, a phosphor bronze spring motor may appropriately be employed. The camera should be automatically self-advancing and a feedback monitor may desirably be included to insure that no film jam is present. Although any sized camera can be used, a 16mm size is preferable so that sufficient film can be loaded to complete the survey.

To further minimize the effects of the magnetic components of the camera 30 and its gyrostabilized platform 32, the upper bird 10 can be of exaggerated length, for example, of 6–10 feet, in distinction with the length of ordinary birds used for magnetic surveys. The extra drag of the long bird is desirable to position this bird further behind the aircraft and at a higher altitude than would be achieved with a low drag bird.

It can thus be seen that in comparing the photographs obtained from the camera means 30 in analysis of the recorded magnetic data and comparing the photographs to maps of the area over which the survey was taken, that the data can be easily and accurately interpreted to produce an accurate magnetic reading.

Additionally, to compensate for noise introduced by the uncertainty in vertical position of the birds, barometric transducers 25 and 26 in the respective birds 15 and 10 are recorded for later comparison to further more precisely define the relative positions of the two birds at the locations at which the data sampling is made. It is noted, however, that the vertical spacing between the two birds ordinarily tends to be constant. That is, if turbulence is encountered in which the upper bird increases in altitude, the lower bird ordinarily also increases in altitude at the same time and by the same amount. Thus, the presence of both such altitude measuring means is not an absolute requirement.

Another embodiment in which the principles of the invention can be employed is in the apparatus for conducting single sensor surveys, and includes only a single bird, such as bird 10 shown in FIG. 1. The survey is conducted just as the dual bird survey above described, except that the lower bird 15 is not used. Thus, at the various locations at which magnetic measurements are made, the camera 30 is actuated to photograph the below lying earth to produce a photograph subsequently matchable with a map of the area. Since the camera is mounted upon a gyrostabilized platform, the use of the camera at the bird itself corrects for much of the uncertainties of the prior art in which the bird often is not even within the photograph.

Although the invention has been described and illustrated with a certain degree of particularity, it is understood that various modifications and changes will become apparent to those skilled in the art without departing from the spirit and scope of the invention as hereinafter claimed.

What is claimed is:

1. A system for measuring magnetic fields from an airplane, comprising:

a first and a second bird;

a high drag cable and a low drag cable by means of which said first and second birds are towed respectively from said airplane so that said first bird is at a higher altitude than said second bird;

separate magnetometer sensing means carried respectively by said first and second birds for measuring at a predetermined rate the magnetic fields at said first and second birds;

means for comparing the fields measured by said respective magnetometer sensing means;

camera means carried by said first bird to photograph the earth therebeneath in synchronism with the magnetic field measuring rate; and means carried by said first bird upon which said camera is mounted for maintaining said camera at a constant downward orientation, whereby the position of said first bird can be accurately recorded.

* * * * *